US011823465B2

(12) United States Patent
Perincherry et al.

(10) Patent No.: US 11,823,465 B2
(45) Date of Patent: Nov. 21, 2023

(54) NEURAL NETWORK OBJECT IDENTIFICATION

(71) Applicant: Ford Global Technologies, LLC, Dearborn, MI (US)

(72) Inventors: Akhil Perincherry, Dearborn, MI (US); Aghapi Mordovanakis, Ann Arbor, MI (US); Sutharsan Sivagnanam, Windsor (CA); Arpita Chand, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 17/228,765

(22) Filed: Apr. 13, 2021

(65) Prior Publication Data

US 2022/0327320 A1 Oct. 13, 2022

(51) Int. Cl.
*G06V 20/58* (2022.01)
*G06N 3/08* (2023.01)
*G01S 13/89* (2006.01)
*G06T 17/20* (2006.01)

(52) U.S. Cl.
CPC .............. *G06V 20/58* (2022.01); *G01S 13/89* (2013.01); *G06N 3/08* (2013.01); *G06T 17/20* (2013.01)

(58) Field of Classification Search
CPC ........ G06V 20/58; G06V 10/82; G06V 20/64; G01S 13/89; G01S 13/867; G01S 13/931; G06N 3/08; G06N 3/0464; G06N 3/0455; G06T 17/20; G06T 2210/12; G06T 2210/56; G06T 19/00
See application file for complete search history.

(56) References Cited

U.S. PATENT DOCUMENTS

| 10,438,371 | B2 | 10/2019 | Xu et al. |
| 11,189,049 | B1* | 11/2021 | Chakravarty ............. G06T 7/73 |
| 11,295,517 | B2* | 4/2022 | Zhou ..................... G06N 3/047 |
| 2020/0265247 | A1 | 8/2020 | Musk et al. |
| 2022/0180106 | A1* | 6/2022 | Voodarla ................. G06N 3/08 |
| 2022/0180170 | A1* | 6/2022 | Ivanovic ............... G06N 3/047 |

FOREIGN PATENT DOCUMENTS

CN 111739005 A 10/2020

OTHER PUBLICATIONS

Cadena C, Dick AR, Reid ID. Multi-modal Auto-Encoders as Joint Estimators for Robotics Scene Understanding. InRobotics: Science and systems Jun. 2016 (vol. 5, No. 1). (Year: 2016).*

(Continued)

*Primary Examiner* — Fayyaz Alam
(74) *Attorney, Agent, or Firm* — Frank A. MacKenzie; Bejin Bieneman PLC

(57) ABSTRACT

Upon identifying image data associated with an object, radar data associated with the object is identified. A semantic point cloud image is generated based on the image data and the radar data. Transformed semantic point cloud image from a perspective of the object is determined with a variational auto-encoder neural network trained to accept the semantic point cloud image of the object and to generate the transformed semantic point cloud image from the perspective of the object. Physical characteristics of the object are determined based on the transformed semantic point cloud image.

20 Claims, 9 Drawing Sheets

(56) References Cited

OTHER PUBLICATIONS

Cui W, Zhou Q, Zheng Z. Application of a hybrid model based on a convolutional auto-encoder and convolutional neural network in object-oriented remote sensing classification. Algorithms. Jan. 16, 2018;11(1):9. (Year: 2018).*

Cui Y, Chen R, Chu W, Chen L, Tian D, Li Y, Cao D. Deep learning for image and point cloud fusion in autonomous driving: A review. IEEE Transactions on Intelligent Transportation Systems. Mar. 17, 2021;23(2):722-39. (Year: 2021).*

Simon M, Amende K, Kraus A, Honer J, Samann T, Kaulbersch H, Milz S, Michael Gross H. Complexer-yolo: Real-time 3d object detection and tracking on semantic point clouds. InProceedings of the IEEE/CVF Conference on Computer Vision and Pattern Recognition Workshops 2019 (pp. 0-0). (Year: 2019).*

Feng D, Haase-Schütz C, Rosenbaum L, Hertlein H, Glaeser C, Timm F, Wiesbeck W, Dietmayer K. Deep multi-modal object detection and semantic segmentation for autonomous driving: Datasets, methods, and challenges. IEEE Transactions on Intelligent Transportation Systems. Feb. 17, 2020;22(3):1341-60. (Year: 2020).*

\* cited by examiner

NEURAL NETWORK OBJECT IDENTIFICATION

BACKGROUND

Vehicles can be equipped with computing devices, networks, sensors, and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
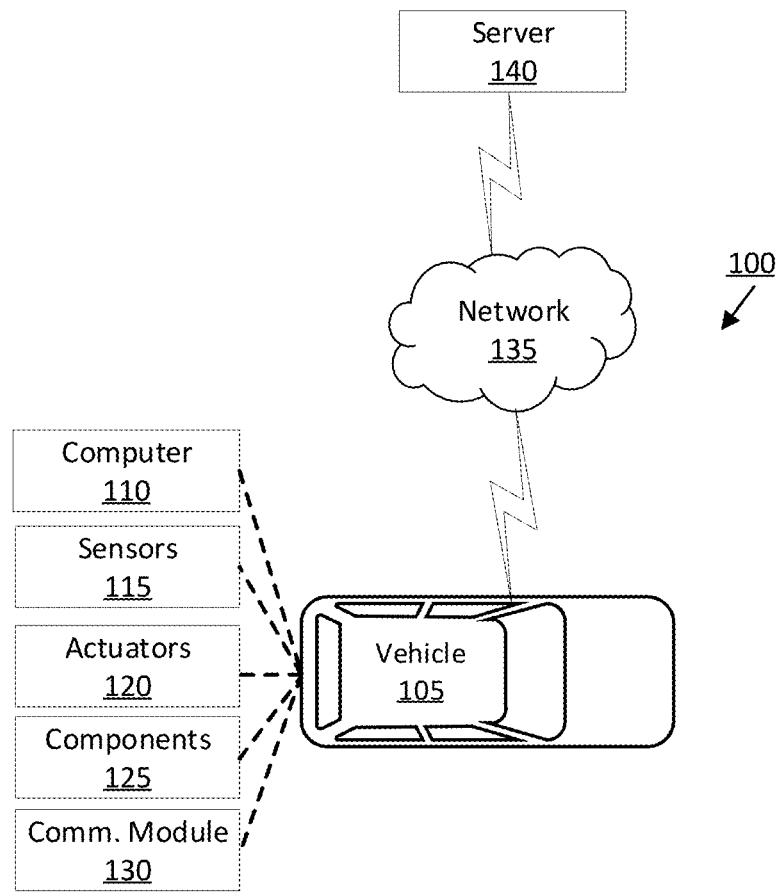
FIG. 1 is a block diagram of an example control system for a vehicle.

A vehicle computer in a vehicle can be programmed to acquire data regarding the environment around the vehicle and to use the data to determine a path upon which to operate the vehicle in an autonomous or semi-autonomous mode. The vehicle can operate on a roadway based on the path by determining commands to direct the vehicle's powertrain, braking, and steering components to operate the vehicle to travel along the path. The data regarding the environment can include the location of one or more objects such as vehicles and pedestrians, etc., in the environment around the vehicle and can be used by the vehicle computer to operate the vehicle.

Determining a path can include performing object detection. That is, the vehicle computer detects object around the vehicle via sensor data. The vehicle computer can detect an object via sensor data from a plurality of sensors, e.g., radar, cameras, etc. Typically, the vehicle computer detects objects from sensor data, e.g., image data, radar data, etc., by generating a bounding box, e.g., two-dimensional (2D) or three-dimensional (3D), that contains all data, e.g., pixels, reflections, etc., associated with the object. However, a bounding box may lack sufficient data to determine a contour of the object such that the vehicle computer may be unable to determine a shape of the object in 3D space around the vehicle. Additionally, a bounding box may lack sufficient data to determine an orientation of the object relative to the vehicle such that the vehicle computer may be unable to determine whether the object is facing a first direction or a second direction opposite the first direction.

Advantageously, an object identification system can be trained to accept image data associated with the object and radar data associated with the object and to generate an output of a transformed semantic point cloud image from the perspective of the object. The object identification system generates a semantic point cloud image of the object from the image data and the radar data associated with the object via generative modeling techniques, e.g., such as using a variational autoencoder neural network, as discussed herein. The transformed semantic point cloud image represents radar data of the object in a frame of reference of the object while maintaining semantic labels of the radar data. The vehicle computer can then input the transformed semantic point cloud image into a neural network trained to generate a determination of physical characteristics of the object, which the vehicle computer can use to determine a path that avoids the object. Techniques described herein improve object detection by generating a transformed semantic point cloud image from the perspective of the object, which specifies a location of each datum of the radar data with respect to the object, and thereby provides a representation of the object that can be used to determine physical characteristics of the object.

A system includes a computer including a processor and a memory, the memory storing instructions executable by the processor to, upon identifying image data associated with an object, identify radar data associated with the object. The instructions further include instructions to generate a semantic point cloud image based on the image data and the radar data. The instructions further include instructions to determine a transformed semantic point cloud image from a perspective of the object with a variational auto-encoder neural network trained to accept the semantic point cloud image of the object and to generate the transformed semantic point cloud image from the perspective of the object. The instructions further include instructions to determine physical characteristics of the object based on the transformed semantic point cloud image.

The instructions can further include instructions to input the transformed semantic point cloud image into a neural network that is trained to output a determination of the physical characteristics of the object.

The instructions can further include instructions to train the variational auto-encoder neural network to output the transformed semantic point cloud image using location data of a vehicle and the object.

The instructions can further include instructions to generate the semantic point cloud image by combining a semantic image of the object and a point cloud image of the object.

The instructions can further include instructions to generate the semantic image based on the image data associated with the object.

The instructions can further include instructions to input the image data associated with the object into a convolutional neural network trained to generate the semantic image.

The instructions can further include instructions to generate the point cloud image based on the radar data associated with the object.

The instructions can further include instructions to input the radar data associated with the object into a deep neural network trained to generate the point cloud image.

The instructions can further include instructions to determine a three-dimensional (3D) bounding box for the object based on the physical characteristics.

The 3D bounding box for the object may be determined in real-world coordinates based on orthogonal x, y, and z axes.

The physical characteristics of the object may include dimensions, a pose, and a contour.

Radar data may be aggregated during a predetermined time period.

The instructions can further include instructions to operate a vehicle based on the physical characteristics of the object.

The instructions can further include instructions to identify the image data associated with the object based on a two-dimensional (2D) bounding box for the object.

The instructions can further include instructions to determine the 2D bounding box for the object with a neural network trained to accept an image including the object and to generate the 2D bounding box for the object.

A method includes, upon identifying image data associated with an object, identifying radar data associated with the object. The method further includes generating a semantic point cloud image based on the image data and the radar data. The method further includes determining a transformed semantic point cloud image from a perspective of the object with a variational auto-encoder neural network trained to accept the semantic point cloud image of the object and to generate the transformed semantic point cloud image from the perspective of the object. The method further includes determining physical characteristics of the object based on the transformed semantic point cloud image.

The method can further include operating a vehicle based on the physical characteristics of the object.

The method can further include inputting the transformed semantic point cloud image into a neural network that is trained to output a determination of the physical characteristics of the object.

The method can further include identifying the image data associated with the object based on a 2D bounding box for the object.

The method can further include determining the 2D bounding box for the object with a neural network trained to accept an image including the object and to generate the 2D bounding box for the object.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-5, an example vehicle control system 100 includes a vehicle 105. A vehicle computer 110 in the vehicle 105 receives data from sensors 115. The vehicle computer 110 is programmed to, upon identifying image data associated with an object 305, identify radar data associated with the object 305. The vehicle computer 110 is further programmed to generate a semantic point cloud image 212 based on the image data and the radar data. The vehicle computer 110 is further programmed to determine a transformed semantic point cloud image 222 from a perspective of the object 305 with a variational auto-encoder neural network trained to accept the semantic point cloud image 212 of the object 305 and to generate the transformed semantic point cloud image 222 from the perspective of the object 305. The vehicle computer 110 is further programmed to determine physical characteristics of the object 305 based on the transformed semantic point cloud image 222.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc.

Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Figure 2:
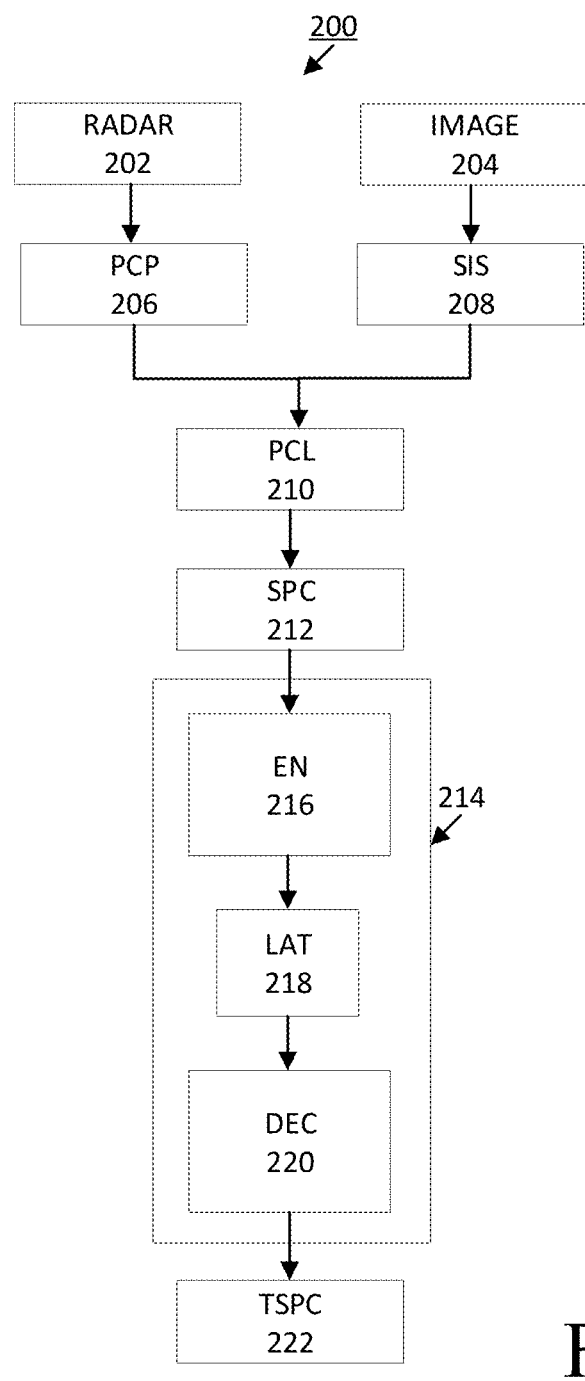
FIG. 2 is a block diagram of an example object identification system for the vehicle.
Figure 3:
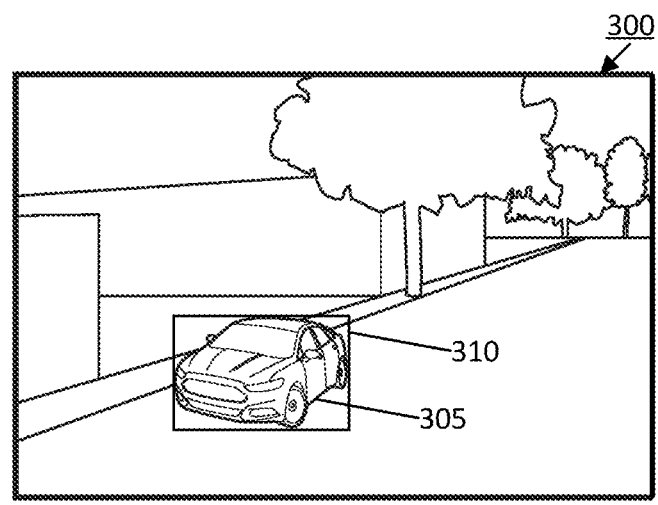
FIG. 3 is an example image including an example object.

Turning further to FIGS. 2 and 3, FIG. 2 is a diagram of an object identification system 200 that generates transformed semantic point cloud images 222 (as discussed below) from data in an image 300 and radar data acquired by the vehicle 105. FIG. 3 shows an example image 300 including an example object 305. The object identification system 200 can be implemented as software operating on the vehicle computer 110. The vehicle computer 110 can use the object identification system 200 to operate the vehicle 105. For example, the vehicle computer 110 can use the transformed semantic point cloud image 222 for determining physical characteristics (as defined below) for objects 305 around the vehicle 105 and determining a path for operating the vehicle 105 around the objects, as discussed below.

The vehicle computer 110 can receive data of an environment around the vehicle 105. For example, the vehicle computer 110 can receive an image 300 of the environment. The image 300 can include an object 305 in the environment. As one example the object 305 may be a vehicle, as shown in the Figures. The object 305 may be any other suitable type of object, e.g., a pedestrian, a bicycle, a drone, etc.

The vehicle computer 110 can identify image data 204 associated with the object 305 from the image 300. For example, the vehicle computer 110 can input the image 300 into a two-dimensional (2D) object detector trained to detect an object 305 in an image 300. The 2D object detector, as is known, is a neural network trained to detect objects 305 in an image 300 and generate a 2D bounding box 310 for the detected object 305. The 2D object detector can be trained using image data as ground truth. Image data can be manually labelled by human operators. The human operators can also determine 2D bounding boxes for the labeled objects.

The vehicle computer 110 can input the image 300 including the object 305 into the 2D object detector. The 2D object detector then outputs a 2D bounding box 310 for the object 305. A "bounding box" is a closed boundary defining a set of pixels. For example, the pixels within a bounding box can represent a same object, e.g., a bounding box can define pixels representing an image of an object. Said differently, a bounding box is typically defined as a smallest rectangular box that includes all of the pixels of the corresponding object. The vehicle computer 110 identifies the image data 204 associated with the object 305 based on the 2D bounding box 310. That is, the vehicle computer 110 determines that the image data, e.g., pixels, contained within the 2D bounding box 310 is associated with the object 305 (see FIG. 3). The vehicle computer 110 can then extract the image data 204 associated with the object 305 from the image 300.

Additionally, the vehicle computer 110 can receive radar data of the environment around the vehicle 105. The radar data can include a plurality of parameters, i.e., measurable values of a physical phenomena, such as azimuth, range, doppler, radar cross-section (RCS), etc. The vehicle computer 110 can generate aggregate radar data by plotting radar data acquired during a predetermined time, e.g., 5 milliseconds, 10 milliseconds, etc., in a common coordinate system of frame of reference. That is, aggregate data is a representation of the reflections received at a radar sensor 115 during the predetermined time. The predetermined time may be determined empirically, e.g., based on testing that allows for determining an amount of time needed to acquire sufficient radar data to detect an object in an environment around a vehicle.

The vehicle computer 110 can identify radar data 202 associated with the object 305 by overlaying the image including the 2D bounding box 310 to the radar data, e.g., using known data fusion techniques, i.e., incorporating data from different sensors and/or types of sensors into a common coordinate system of frame of reference. By overlaying the 2D bounding box 310 to the radar data, the 2D bounding box 310 can specify coordinates of the object 305 with respect to the radar data. That is, the 2D bounding box 310 can specify radar data representing the object 305. The vehicle computer 110 can then determine that the radar data within the 2D bounding box 310 is associated with the object 305. The vehicle computer 110 can then extract the radar data 202 associated with the object 305 from the radar data.

The radar data 202 associated with the object 305 may be obtained by a plurality of radar sensors 115. That is, each of the plurality of radar sensors 115 can receive reflections from the object 305. The radar data 202 associated with the object 305 may form a point cloud. A "point cloud" is a set of data in a 3D coordinate system, e.g., a Cartesian coordinate system with a lateral axis X, a longitudinal axis Y, and a vertical axis Z. That is, the plurality of radar sensors 115 can collect data as a set of 3D data points, the 3D data points forming a volume in the coordinate system. The volume defined by the set of 3D data points is the point cloud.

The vehicle computer 110 can determine physical characteristics for the object 305 based on the image data 204 associated with the object 305 and the radar data 202 associated with the object 305. For example, the vehicle computer 110 can input the image data 204 associated with the object 305 and the radar data 202 associated with the object 305 into the object identification system 200. The object identification system 200 can generate a transformed semantic point cloud image 222 from a perspective of the object 305 using latent variables 218 from a neural network, as discussed below.

Physical characteristics are measurable values that describe a physical state of an object. Non-limiting examples of physical characteristics include dimensions (e.g., length, width, height), contour, a pose (i.e., a location relative to a coordinate system (e.g., a set of coordinates specifying a position in the coordinate system, e.g., X, Y, Z coordinates) and an orientation (e.g., a yaw, a pitch, and a roll about each axis in the coordinate system), a type (e.g., a vehicle, a pedestrian, etc.), a velocity, etc.

Figure 4A:
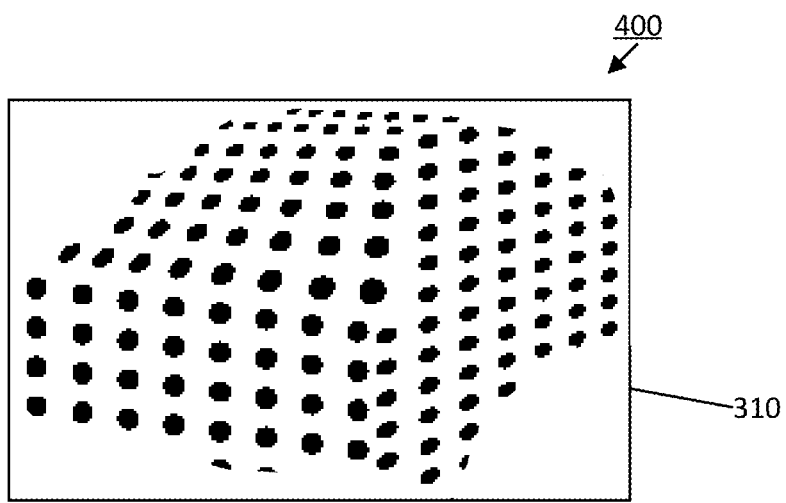
FIG. 4A is an example point cloud image of the example object.
Figure 4B:
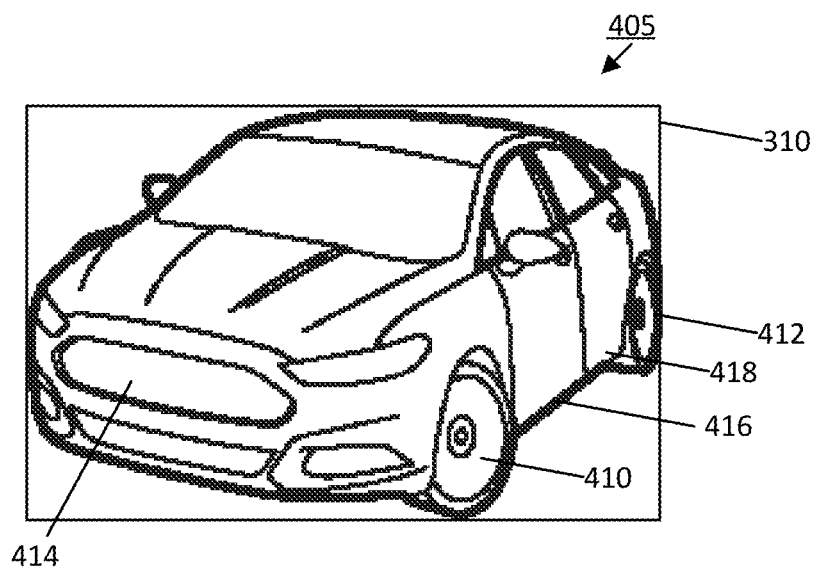
FIG. 4B is an example semantic image of the example object.

The radar data 202 associated with the object 305 is passed to a point cloud processor (PCP) 206. PCP 206 processes the radar data 202 associated with the object 305 to form a point cloud image 400 (see FIG. 4A) from the radar data 202 associated with the object 305 by determining three dimensional locations of corresponding feature points based on reflections received from the feature points at a radar sensor 115. In this context, a "point cloud image" is a 2D representation of point cloud data from a perspective of the radar sensor 115 that includes distances or ranges to points in the image. The point cloud data may be represented as a plurality of dots, as shown in FIG. 4A. The plurality of dots shown in FIG. 4A are merely illustrative of an example point cloud image; it will be understood that a typical point cloud image includes many more points, and in a less clear arrangement, then shown in the present figures. The point cloud image 400 may be generated from at least one of the parameters of radar data, e.g., RCS, doppler, etc. Different physical characteristics for the object 305 may be identified based on generating the point cloud image 400 from different parameters of the radar data.

A point cloud image 400 can be determined by training a deep neural network to determine the point cloud image 400 from radar data 202 associated with an object 305. A deep neural network can include a plurality of convolutional layers followed by a plurality of fully connected layers. The convolutional layers can determine the feature points, which are passed as latent variables to the fully connected layers, which calculates a distance between a radar sensor 115 and a feature point. Distances to a plurality of corresponding feature points determined in this fashion can be assembled into a point cloud image 400. A DNN can be trained to determine a point cloud image 400 from radar data 202 associated with an object 305 using a training dataset that includes radar data 202 associated with various objects along with ground truth point cloud images 400 that have been determined using feature points and distances to the feature points based on reflections received from the feature points at the sensor 115. Ground truth is data corresponding to a correct result output from a DNN, i.e., data correctly representing a real-world state, where the ground truth data is acquired from a source independent from the DNN. Ground truth is used to compare to the result output from a DNN when training the DNN to determine when the DNN is outputting a correct result. For example, ground truth for point cloud data can be determined by manually selecting corresponding feature points in radar data 202 associated with an object 305 and calculating distances based on reflections received from the feature points at a radar sensor 115 to form ground truth point cloud data.

Additionally, the image data 204 associated with the object 305 is passed to an image segmentation processor (SIS) 208. SIS 208 segments the image data 204 associated with the object 305 to generate a semantic image 405 (see FIG. 4B). In this context, "a semantic image" is an image that is labeled with semantic class values that identify a type of object component within the image. That is, each pixel in the image is labeled with one semantic class value corresponding to the type of object component detected in the pixel, as discussed further below.

A semantic image 405 is generated from image data 204 associated with the object 305. For example, the image data 204 associated with the object 305 can be input to a convolutional neural network (CNN) that has been trained to segment images. Image segmentation is a machine vision technique that labels object components in image data. That is, the CNN can be programmed to segment and classify object components based on connected regions of pixels in RGB (red-green-blue) image data.

The connected regions can be classified by labeling each connected region with one of a number of different semantic class values corresponding to object components. As set forth above, each semantic class value is an integer that corresponds to one type of object component or region. The semantic class values can be selected by the CNN based on the size, shape, and location of the object components in an RGB image. For example, a CNN can include different semantic class values for different types of object components. The CNN can label object components in an input image and then the labels can be combined with the point cloud image 400, as discussed below.

The CNN can be trained to label regions in RGB image data by first constructing a training dataset, where RGB images are labeled manually by humans using image processing software to draw boundaries around object components and filling in the boundaries with pixel values corresponding to the object components. The manually labeled RGB images are ground truth to be compared with the output of the CNN. The dataset can include a large number, e.g., at least more than 1000, RGB images with corresponding ground truth. The CNN is executed a plurality of times with the same RGB image as input while changing sets of parameters that govern the operation of the convolutional layers and fully connected layer included in the CNN. The sets of parameters are graded depending upon how similar the output is to the corresponding ground truth. The highest scoring sets of parameters over the training dataset are retained as the set of parameters to use when operating the trained CNN.

Figure 4C:
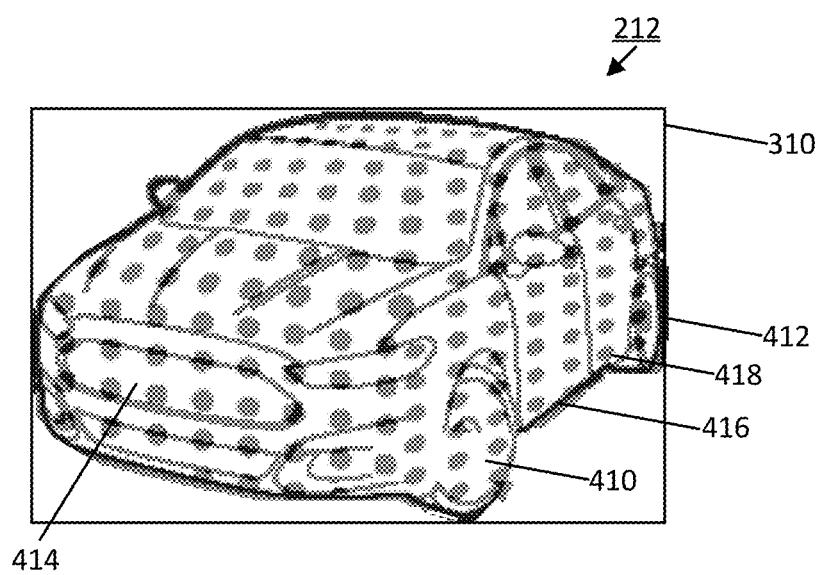
FIG. 4C is an example semantic point cloud image of the example object.

The semantic image 405 is passed to a point cloud labeling processor (PCL) 210 where a point cloud image 400 from PCP 206 is combined with the semantic image 405 to form a semantic point cloud image 212 (see FIG. 4C), e.g., using various techniques for fusing (i.e., incorporating into a common coordinate system or frame of reference) the point cloud image 400 and the semantic image 405. The semantic point cloud image 212 can be determined in coordinates of a coordinate system based on orthogonal x, y, and z axes having respective origins at the vehicle 105. In this context, a "semantic point cloud image" is a point cloud image that includes labels that identify regions within the image corresponding to object components. Said differently, a semantic point cloud image 212 is a point cloud image where the point cloud data corresponding to distances (represented as the plurality of dots shown in FIG. 4C) is also labeled with semantic class values to identify the type of object component. For example, when the object 305 is a vehicle, the object 305 components can include wheels 410, 412, doors 416, 418, a grille 414, etc., as shown in FIG. 4C. A semantic class value is an identifier, typically an integer, that corresponds to one type of object or region.

The semantic point cloud image 212 is then input into a variational autoencoder (VAE) 214 that can be trained to accept a semantic point cloud image 212 of an object 305 and output a transformed semantic point cloud image 222 from a perspective of the object 305. A VAE 214 is a neural network that includes an encoder (EN) 216, a decoder (DEC) 220, and a loss function. The encoder 216 includes convolutional layers that encodes the semantic point cloud image 212 into latent variables (LAT) 218. The decoder 220 uses fully-connected layers and convolutional layers to decode the latent variables 218 into a transformed semantic point cloud image 222 from the perspective of the object 305.

A VAE 214 can be trained to receive input image data, encode the image data to form latent variables 218 that correspond to an encoded representation of the input image data and decode the latent variables 218 to output an image that includes portions of the input image data modified in a deterministic fashion. The VAE 214 can be trained by determining a loss function which measures how accurately the VAE 214 has encoded and decoded the image data. The loss function is used to train the encoder 216 and decoder 220 by determining whether the transformed semantic point cloud images 222 are valid for an object 305 position and orientation relative to a vehicle based on training the encoder 216 and decoder 220 using ground truth data regarding transformed semantic point cloud images 222 manually labeled by human operators as ground truth. For example, the VAE 214 can be trained using transformed semantic point cloud images 222 that are labeled for various objects at various positions and orientations relative to a vehicle. The ground truth can be compared to the output from the VAE 214 to train the VAE 214 to correctly label transformed semantic point cloud images 222 for various objects at various positions and orientations relative to a vehicle.

Figure 5:
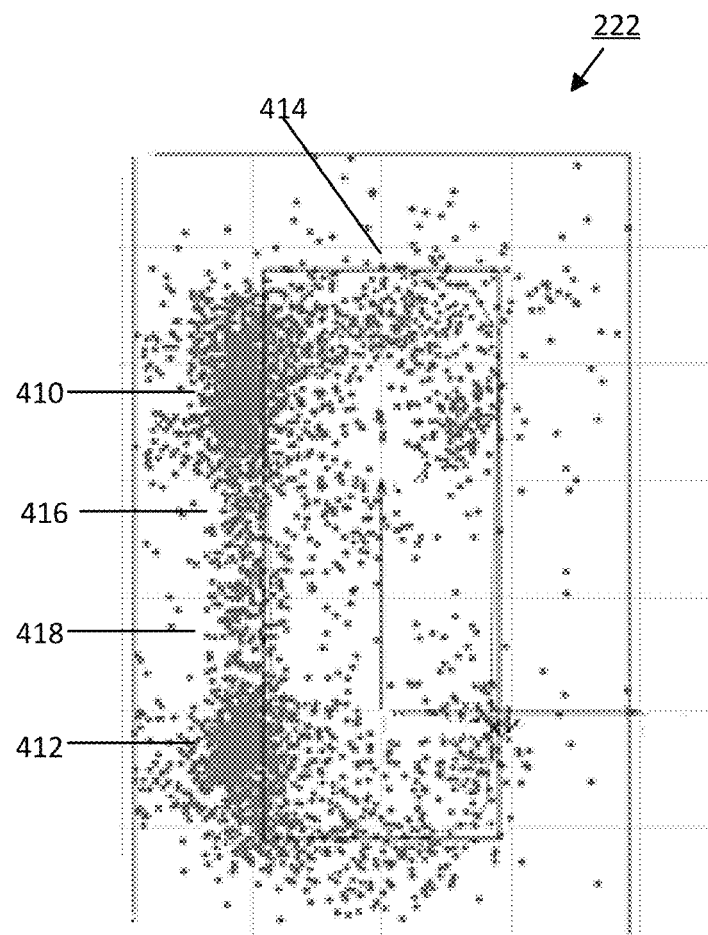
FIG. 5 is an example transformed semantic point cloud image.

FIG. 5 is a diagram of an example transformed semantic point cloud image 222 of an object 305 generated from an example semantic point cloud image 212 for training the VAE 214. A semantic point cloud image 212 represents point cloud data from the perspective, i.e., frame of reference, of a vehicle 105. The transformed semantic point cloud image 222 represents the point cloud data of the semantic point cloud image 212 from the perspective of the object 305.

The transformed semantic point cloud image 222 can be generated by transforming the point cloud data of the semantic point cloud image 212 based on a transformation offset. A transformation offset specifies a translational difference, e.g., measured in meters, along the x, y, and z axes and a rotational difference, e.g., measured in degrees, about each of the three orthogonal axes between the vehicle 105 and the object 305. The transformation offset is combined with the point cloud data to generate transformed point cloud data, e.g., by using geometric transformation to update the coordinates of the feature points according to the translational and rotational differences specified by the transformation offset. The transformed point cloud data retains the corresponding semantic labels from the semantic point cloud image 212, which allows the point cloud data to be identified after transforming the semantic point cloud image 212 into the transformed point cloud image 222. For example, as shown in FIG. 5, the transformed semantic point cloud image 222 retains the semantic labels for the object 305 components, such as wheels 410, 412, doors 416, 418, a grille 414, etc.

The transformation offset can be determined based on a position and orientation of the object 305 relative to the vehicle 105. The positions of the object 305 and the vehicle 105 can be determined from real time global positioning sensors (RT-GPS) mounted to each of the object 305 and the vehicle 105. For example, RT-GPS sensors can specify geo-coordinates for the object 305 and the vehicle 105, respectively. Additionally, a respective orientation for the object 305 and the vehicle 105 can be determined by connecting respective temporally successive geo-coordinates, which specifies corresponding directions of travel for the object 305 and the vehicle 105. The transformation offset is determined from the differences in positions between the vehicle 105 and object 305 and the differences in orientations between the vehicle 105 and the object 305.

The transformed semantic point cloud image 222 can be determined in coordinates of a 3D coordinate system based on orthogonal x, y, and z axes having respective origins at the object 305. The transformed point cloud data can then be plotted into a 2D plane. For example, x and z coordinates of the transformed point cloud data can be plotted, as shown in FIG. 5. In this situation, the x coordinates can be plotted along a horizontal axis, e.g., generally parallel to a object-lateral axis, and the z coordinates can be plotted along a vertical axis, e.g., generally parallel to an object-longitudinal axis.

Figure 6:
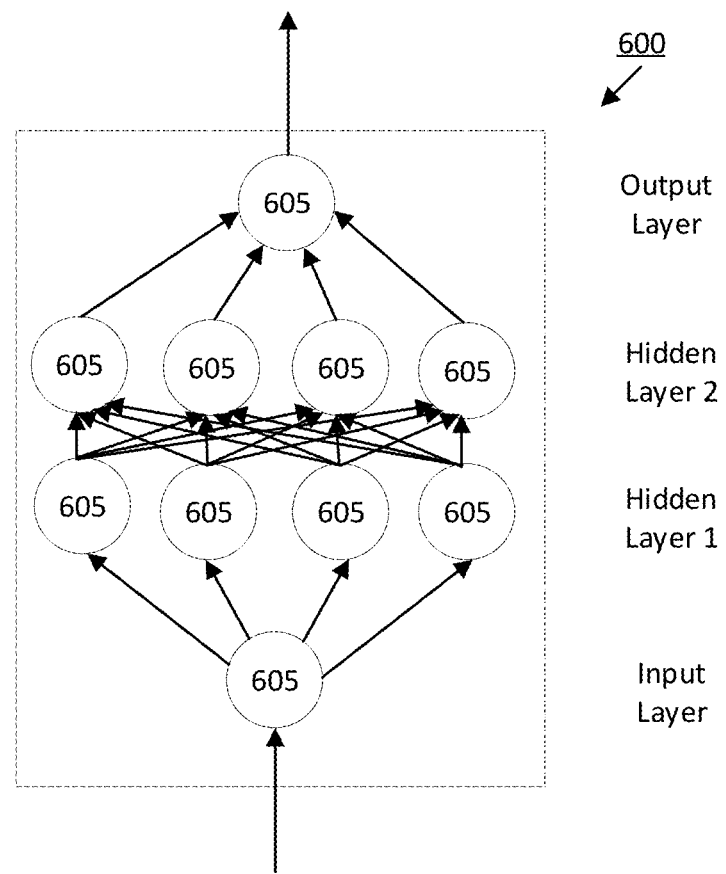
FIG. 6 is an example deep neural network.

Upon determining the transformed semantic point cloud image 222 from the perspective of the object 305, the vehicle computer 110 can determine physical characteristics of the object 305, e.g., by inputting the transformed semantic point cloud image 222 into a neural network, such as a deep neural network (DNN) 600 (see FIG. 6). The DNN 600 can be trained to accept the transformed semantic point cloud image 222 as input and generate an output of a determination of physical characteristics of the object 305.

Inputting the transformed semantic point cloud image 222 into the DNN 600 can improve object identification because the transformed semantic point cloud image 222 represents the radar data 202 associated with the object 305 from the perspective of the object 305. The vehicle computer 110 may be unable to determine one or more physical characteristics of an object 305 from radar data received by a vehicle sensor 115. By representing the radar data 202 associated with the object 305 from the perspective of the object 305, the transformed semantic point cloud image 222 includes additional details about the object 305, which can assist in determining additional physical characteristics of the object 305. As one example, RCS values (i.e., a measure of how detectable an object is from radar data) of reflections from the perspective of the object 305 can be used to identify boundaries of the object 305 and a type of the object 305 (e.g., a compact vehicle towing a trailer, a full-size pick-up truck, etc.). For example, RCS values may be larger around rotating components, e.g., wheels, of the object 305 than non-rotating components. Additionally, RCS values may vary based on a type of material of a component of the object 305. RCS values can be determined using known data processing techniques. As another example, radar reflections from the perspective of the object 305 can indicate an orientation of the object 305 relative to the vehicle 105 based on the radar reflections being distributed on one side of the object 305. As another example, distribution of the radar reflections from the perspective of the object 305 can indicate the contour of the object 305. The additional details included in the transformed semantic point cloud image 222 improves object detection by reducing the computational load on the DNN 600 to determine the physical characteristics of the object 305, e.g., dimensions, a contour, an orientation, etc.

The vehicle computer 110 can generate a three-dimensional (3D) bounding box for the object 305 based on the physical characteristics of the object 305 output from the DNN 600, e.g., a pose (as described above) and dimensions of the object 305. A 3D bounding box is similar to a 2D bounding box 310, differing in that the 3D bounding box is typically defined as a smallest rectangular prism that includes all of the pixels of the corresponding object 305. The 3D bounding box is described by contextual information including a center and eight corners, which are expressed as x, y, and z coordinates real-world coordinates. The pose for the object 305 can be the center of the 3D bounding box. The vehicle computer 110 can then determine the coordinates of the eight corners from the dimensions of the object 305 by using geometric transformations.

For example, the vehicle computer 110 can determine a lower front right corner of the 3D bounding box based on i) a first line that is half the length of the object 305 and extends forward from the center along the x axis and at the pitch specified by the pose, ii) a second line that is half the width of the object 305 and extends rightward from an end of the first line along the y axis and at the yaw specified by the pose, and iii) a third line that is half the height of the object 305 and extends downward from an end of the second line along the z axis and at the roll specified by the pose. The coordinates for the lower front right corner are determined from an end of the third line. The other seven corners can be determined by changing the directionality of at least one of the first line, the second line, or the third line (e.g., forward to backward, leftward to rightward, and/or upward to downward).

Upon determining the 3D bounding box for the object 305, the vehicle computer 110 can, for example, generate a path to avoid the object 305. The vehicle computer 110 can then actuate one or more vehicle components to operate the vehicle 105 along the path to avoid the object 305. As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \qquad (1)$$

where $a_0$ an offset, i.e., a lateral distance between the path and a center line of the host vehicle 105 at the upcoming distance x, $a_1$ is a heading angle of the path, $a_2$ is the curvature of the path, and $a_3$ is the curvature rate of the path.

FIG. 6 is a diagram of an example deep neural network (DNN) 600 that can be trained to determine physical characteristics of an object 305 based on a transformed semantic point cloud image 222 from the perspective of the object 305. The DNN 600 can be a software program that can be loaded in memory and executed by a processor included in a computer, for example. In an example implementation, the DNN 600 can include, but is not limited to, a convolutional neural network (CNN), R-CNN (Region-based CNN), Fast R-CNN, and Faster R-CNN. The DNN 600 includes multiple nodes, and the nodes are arranged so that the DNN 600 includes an input layer, one or more hidden layers, and an output layer. Each layer of the DNN 600 can include a plurality of nodes 605. While FIG. 6 illustrate three hidden layers, it is understood that the DNN 600 can include additional or fewer hidden layers. The input and output layers may also include more than one node 605.

The nodes 605 are sometimes referred to as artificial neurons 605, because they are designed to emulate biological, e.g., human, neurons. A set of inputs (represented by the arrows) to each neuron 605 are each multiplied by respective weights. The weighted inputs can then be summed in an input function to provide, possibly adjusted by a bias, a net input. The net input can then be provided to an activation function, which in turn provides a connected neuron 605 an output. The activation function can be a variety of suitable functions, typically selected based on empirical analysis. As illustrated by the arrows in FIG. 6, neuron 605 outputs can then be provided for inclusion in a set of inputs to one or more neurons 605 in a next layer.

As one example, the DNN 600 can be trained with ground truth data, i.e., data about a real-world condition or state. For example, the DNN 600 can be trained with ground truth data and/or updated with additional data by a processor of the remote server computer 140. Weights can be initialized by using a Gaussian distribution, for example, and a bias for each node 605 can be set to zero. Training the DNN 600 can include updating weights and biases via suitable techniques such as back-propagation with optimizations. Ground truth data used for training can include, but is not limited to, data manually labeled by human operators as specifying physical characteristics of objects, e.g., dimensions, contour, pose, velocity, etc.

During operation, the vehicle computer 110 obtains the transformed semantic point cloud image 222 from the object identification system 200. The vehicle computer 110 can provide the transformed semantic point cloud image 222 to the DNN 600. The DNN 600 generates an output based on the received input. The output is a determination of physical characteristics of an object 305. For example, the DNN 600 can output dimensions of the object 305, a pose of the object 305, a contour of the object 305, a velocity of the object 305, etc.

Figure 7:
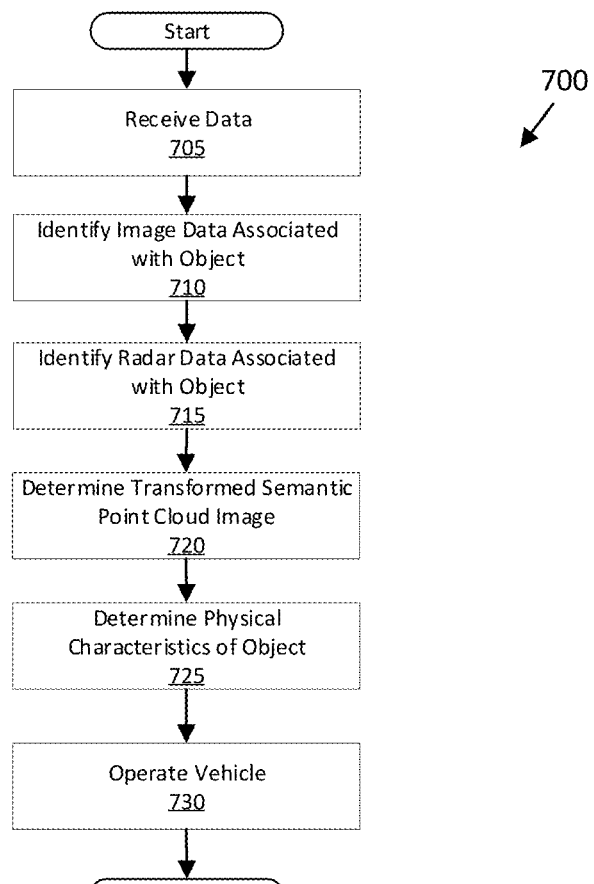
FIG. 7 is a flowchart of an example process for operating the vehicle.

FIG. 7 is a diagram of an example process 700 for operating a vehicle 105. The process 700 begins in a block 705. The process 700 can be carried out by a vehicle computer 110 included in the vehicle 105 executing program instructions stored in a memory thereof.

In the block 705, the vehicle computer 110 receives data from one or more sensors 115, e.g., via a vehicle network. For example, the vehicle computer 110 can receive image data, e.g., from one or more image sensors 115, and radar data, e.g., from one or more radar sensors 115. The radar data may be aggregated during a predetermined time, as discussed above. The sensor 115 data may include data about the environment around the vehicle 105, e.g., one or more objects 305. The process 700 continues in a block 710.

In the block 710, the vehicle computer 110 identifies image data 204 associated with an object 305. For example, the vehicle computer 110 can input an image 300 including the object 305 to a 2D object detector that is trained to output a 2D bounding box 310 for the object 305, as discussed above. The vehicle computer 110 can then identify the image data 204 associated with an object 305 based on the 2D bounding box 310, as discussed above. The vehicle computer 110 extracts the image data 204 associated with the object 305 from the image 300. The process 700 continues in a block 715.

In the block 715, the vehicle computer 110 identifies radar data 202 associated with the object 305 based on the 2D bounding box 310, as discussed above. The vehicle computer 110 can then extract the radar data 202 associated with the object 305 from the radar data. The process 700 continues a block 720.

In the block 720, the vehicle computer 110 determines a transformed semantic point cloud image 222 from a perspective of the object 305. The vehicle computer 110 inputs the image data 204 associated with the object 305 and the radar data 202 associated with the object 305 into an object identification system 200. The object identification system 200 generates a semantic point cloud image 212 based on the image data 204 associated with the object 305 and the radar data 202 associated with the object 305, as discussed above. The object identification system 200 then inputs the semantic point cloud image 212 into a VAE 214 trained to output the transformed semantic point cloud image 222 from the perspective of the object 305, as discussed above. The process 700 continues in a block 725.

In the block 725, the vehicle computer 110 determines physical characteristics of the object 305 based on the transformed semantic point cloud image 222. For example, the vehicle computer 110 can input the transformed semantic point cloud image 222 into a DNN 600 that can generate an output of a determination of physical characteristics of the object 305, as discussed above. The process 700 continues in a block 730.

In the block 730, the vehicle computer 110 operates the vehicle 105. For example, the vehicle computer 110 can determine a 3D bounding box for the object 305 based on the physical characteristics of the object 305, as discussed above. The vehicle computer 110 can determine a path along which to operate the vehicle 105 that avoids the 3D bounding box of the object 305, as discussed above. The vehicle computer 110 can actuate one or more vehicle components 125, to move the vehicle 105 along the path. The process 700 ends following the block 730.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

What is claimed is:

1. A system, comprising a computer including a processor and a memory, the memory storing instructions executable by the processor to:
   upon identifying image data associated with an object, identify radar data associated with the object;
   generate a semantic point cloud image based on the image data and the radar data;
   determine a transformed semantic point cloud image from a perspective of the object with a variational auto-encoder neural network trained to accept the semantic point cloud image of the object and to generate the transformed semantic point cloud image from the perspective of the object; and
   determine physical characteristics of the object based on the transformed semantic point cloud image.

2. The system of claim 1, wherein the instructions further include instructions to input the transformed semantic point cloud image into a neural network that is trained to output a determination of the physical characteristics of the object.

3. The system of claim 1, wherein the instructions further include instructions to train the variational auto-encoder neural network to output the transformed semantic point cloud image using location data of a vehicle and the object.

4. The system of claim 1, wherein the instructions further include instructions to generate the semantic point cloud image by combining a semantic image of the object and a point cloud image of the object.

5. The system of claim 4, wherein the instructions further include instructions to generate the semantic image based on the image data associated with the object.

6. The system of claim 5, wherein the instructions further include instructions to input the image data associated with the object into a convolutional neural network trained to generate the semantic image.

7. The system of claim 4, wherein the instructions further include instructions to generate the point cloud image based on the radar data associated with the object.

8. The system of claim 7, wherein the instructions further include instructions to input the radar data associated with the object into a deep neural network trained to generate the point cloud image.

9. The system of claim 1, wherein the instructions further include instructions to determine a three-dimensional bounding box for the object based on the physical characteristics.

10. The system of claim 9, wherein the three-dimensional bounding box for the object is determined in real-world coordinates based on orthogonal x, y, and z axes.

11. The system of claim 1, wherein the physical characteristics of the object include dimensions, a pose, and a contour.

12. The system of claim 1, wherein radar data is aggregated during a predetermined time period.

13. The system of claim 1, wherein the instructions further include instructions to operate a vehicle based on the physical characteristics of the object.

14. The system of claim 1, wherein the instructions further include instructions to identify the image data associated with the object based on a two-dimensional bounding box for the object.

15. The system of claim 14, wherein the instructions further include instructions to determine the two-dimensional bounding box for the object with a neural network trained to accept an image including the object and to generate the two-dimensional bounding box for the object.

16. A method, comprising:
upon identifying image data associated with an object, identifying radar data associated with the object;
generating a semantic point cloud image based on the image data and the radar data;
determining a transformed semantic point cloud image from a perspective of the object with a variational auto-encoder neural network trained to accept the semantic point cloud image of the object and to generate the transformed semantic point cloud image from the perspective of the object; and
determining physical characteristics of the object based on the transformed semantic point cloud image.

17. The method of claim 16, further comprising operating a vehicle based on the physical characteristics of the object.

18. The method of claim 16, further comprising inputting the transformed semantic point cloud image into a neural network that is trained to output a determination of the physical characteristics of the object.

19. The method of claim 16, further comprising identifying the image data associated with the object based on a two-dimensional bounding box for the object.

20. The method of claim 19, further comprising determining the two-dimensional bounding box for the object with a neural network trained to accept an image including the object and to generate the two-dimensional bounding box for the object.

* * * * *